(12) United States Patent
Pollock et al.

(10) Patent No.: US 6,399,367 B1
(45) Date of Patent: Jun. 4, 2002

(54) APPARATUS AND SYSTEM FOR PLANT PRODUCTION

(75) Inventors: Robert Pollock, Chapel Hill, NC (US); Jeffrey W. Adelberg, Pendleton, SC (US); Charles Fox, Greenwood, SC (US); Gianpaolo Bonaca, Hodges, SC (US)

(73) Assignee: Clemson University, Clemson, SC (US)

(*) Notice: Subject to any disclaimer, the term of this patent is extended or adjusted under 35 U.S.C. 154(b) by 0 days.

(21) Appl. No.: 09/796,034

(22) Filed: Feb. 28, 2001

(51) Int. Cl.[7] ............................................. C12M 1/00
(52) U.S. Cl. ........................ 435/292.1; 435/286.5; 47/1.42; 47/88; 47/DIG. 3; 126/621; 126/634; 126/678
(58) Field of Search ..................... 435/292.1, 286.5; 47/1.42, 17, 18, 88, DIG. 3; 126/621, 634, 678

(56) References Cited

U.S. PATENT DOCUMENTS

| | | | |
|---|---|---|---|
| 4,108,373 A | * | 8/1978 | Chiapale et al. |
| 4,291,674 A | * | 9/1981 | Comte et al. ............... 126/419 |
| 4,470,405 A | * | 9/1984 | Landstrom et al. ......... 126/428 |
| 4,975,377 A | | 12/1990 | Key |
| 5,171,683 A | | 12/1992 | Kertz |
| 5,324,657 A | | 6/1994 | Tanny |
| 5,525,505 A | | 6/1996 | Young et al. |
| 5,597,731 A | | 1/1997 | Young et al. |

OTHER PUBLICATIONS

Jeff Adelberg, McNair Bostick, David Bishop and Robert Pollock, Transplant Production in the 21st Century, pp. 131–137, Netherlands 2000.

Robert K. Pollock, (Thesis) Cooling Characteristics of a Greenhouse Polycarbonate Fluid Roof Panel.

* cited by examiner

Primary Examiner—David A. Redding
(74) Attorney, Agent, or Firm—Dority & Manning, P.A.

(57) ABSTRACT

A system and apparatus for growing plants is disclosed. The system includes a first thermal panel with multiple flow channels, the thermal panel being located between a growing space and a light source. A cooling fluid is circulated in a countercurrent flow pattern (i.e. in at least two different directions). The channels may be connected to one or more headers, which serve as a fluid manifold to deliver fluid and collect fluid from the flow channels. Growing closely spaced plants from seed or cuttings to transplants for the field or a greenhouse is one application of this system.

25 Claims, 4 Drawing Sheets

APPARATUS AND SYSTEM FOR PLANT PRODUCTION

BACKGROUND OF THE INVENTION

The invention relates to plant propagation systems, and more particularly to propagation systems and apparatus that reduce heat generated by light that is directed upon plants which are located in a growing space.

Tissue culture propagation, sometimes referred to as micro propagation, is the process of growing plants from a piece of plant tissue that has been extracted from a parent plant. Horticulturists favor plant propagation as a growing method because its provides relatively high production efficiency and greater uniformity of plants. The process results in mass production of plants having certain desirable characteristics because substantially all the plants produced are genetically identical to and have all the desirable traits of the parent plant.

Plant propagation may be described as subdivided into stages. Stage one is sometimes said to comprise initiation, in which a plant shoot or bulb is initiated in a growing media. Stage two comprises a multiplication phase in which nutrients and hormones are provided to enable rapid cell division and substantial growth of the plant. In stage two, it is very important to keep pathogens and biological pests from harming the plant. In stage three, the plant is moved out of the laboratory environment and into a greenhouse, where the plant may begin to take on larger amounts of heat and light, developing roots that will be needed for transfer to the field in the natural environment outdoors. It is important to avoid subjecting the entire crop or field to biological pests, and one way to accomplish that result is to propagate the plants in an environment that shields the maturing plant from pathogens, while also facilitating rapid and vigorous growth. Sometimes, a fourth stage is employed to form a root on the shoot, thereby completing development of a whole plant.

Apparatus and methods have been devised to micro propagate plants in the above referenced manner. For example, U.S. Pat. Nos. 5,525,505 (the "'505 patent) and 5,597,731 are directed to plant propagation systems that use sealed vessels. Such systems employ chambers that have been sold commercially as Acclimatron™ vessels ("Acclimatron" is a trademark of the Southern Sun Company). These two referenced patents disclose sealed, semipermeable membrane vessels for completely enclosing plant material therein. The sealed vessels typically are translucent and permeable to gases and liquids while remaining impermeable to biological contaminates. Plant tissue extracted from a parent plant may be placed within the sealed vessels and grown heterotrophically. Once it develops, the plant may be transferred to a greenhouse environment for photoautotrophic growth. In the greenhouse environment, the sealed vessels are supported in trays, and exposed to light, gases, water, and a liquid nutrient solution for optimizing growth.

In the '505 patent, FIG. 5 shows a spectral filter designed to contain a colorized liquid for filtering light. See column 10, lines 37–68 of the '505 patent. The filter is said to include channelized glazing extending in between an intake chamber and an exit chamber. The patent references that colorized liquid may be added to the spectral filter. The spectral filter can be used to control temperatures within the vessel support tray, to prevent the plant material within the sealed vessels from becoming overheated. A spectral filter of the type shown in the '505 patent is sometimes called a water jacket panel. In general, they rely upon shading from the spectral filter to provide a cooling effect. Furthermore, they may employ conventional cooling mechanisms of growth chamber water jackets.

Unfortunately, even devices as shown in the '505 patent still cannot meet all the needs of plant growers. Sealed vessels are expensive and costly to use as a growing medium for plants on a commercial scale that must be produced very cheaply. Furthermore, heat generated by light impacting a chamber is very intense in summer growing seasons, and spectral filters sometimes cannot adequately carry away heat to ensure that plants are shielded from damaging heat. Thus, growth of plants is limited under such conditions.

What is needed in the plant propagation industry is a method and apparatus for producing plants to facilitate a more efficient cooling effect upon the growing space where the plants are located in the chamber. An apparatus that is capable of circulating a cooling fluid in a more efficient manner to take advantage of the physics of radiation from a black body would be desirable. Furthermore, a top panel or lid system that can more efficiently cool plants, and provide for better and faster growth, at less cost, would be highly desirable.

SUMMARY OF THE INVENTION

The present invention recognizes and addresses the foregoing disadvantages, and others of prior art constructions, and methods.

Accordingly, it is an object of the present invention to provide a plant propagation system.

It is another object of the present invention to provide a new apparatus and system for propagating plant material.

It is a further object of the present invention to provide a plant propagation system and method that does not rely upon conventional cooling mechanisms, and instead employs an infrared heat sink.

It is another object of the present invention to provide a plant propagation system and method that prevents contamination of the growing plant material.

It is another object of the present invention to provide a plant propagation system and method that reduces substantially heat, to provide a temperature in the growing space that is conducive for plant growth.

It is a further object of the present invention to employ an apparatus for cooling plant containers during growth using a flow regime and direction that accommodates utilizes black body radiation, convective air movement for better control of leaf temperature.

The invention comprises a system and apparatus for growing plants. The system includes a first thermal panel with at least two flow channels. A thermal panel is located between a growing space and a light source. A cooling fluid is circulated in a countercurrent flow pattern (i.e. in at least two different directions). The channels may be connected to one or more headers, which serve as fluid manifolds to deliver fluid, and to collect fluid, from the flow channels. Growing closely spaced plants from seed or cuttings to transplants for the field or a greenhouse is one application of the system. Transplants increase their economic value when their vegetative or reproductive responses are appropriately regulated. In general, the system can minimize energy and material consumption while, at the same time, optimizing photosynthetic and photomorphogenic characteristics in the plants.

The system also optionally may provide that the first thermal panel is subdivided into a plurality of channels. The system may provide at least a first channel and a second channel substantially parallel to each other. The system, in one embodiment, may include a cooling fluid that flows in a first direction in the first channel, and in a second direction in the second channel. The first direction and second direction are essentially opposed to each other.

The system optionally may include a third channel and a fourth channel, the third channel lying adjacent the second channel and the fourth channel lying adjacent the third channel. In that way, the first, second, third, and fourth channels are aligned substantially parallel to each other.

The system optionally may provide for a flow direction along the third channel that is in the first direction. Further, the flow direction along the fourth channel is in the second direction. In that way, the flow direction in respective channels alternates from the first direction to the second direction in successive channels.

The system also may include a first thermal panel providing a heat sink so that a significant portion of heat generated from radiation transmitted into the first thermal panel is absorbed and transferred away and out of the first thermal panel by the cooling fluid. The cooling fluid may consist essentially of water, or may optionally consist of ethylene glycol, or any other fluid that efficiently and effectively transfers heat in an efficient and economical manner.

The plants grown in the system further may include photoreceptor sites upon their leaves, so that a leaf surface may act as a heat source within the growth chamber due to the absorption of light. The first thermal panel includes an upper and a lower surface. The average temperature difference between photoreceptor sites and the lower surface of the first thermal panel is at least 20 degrees C. The system of claim 1 also provides a second thermal panel so that the plants are located between the first thermal panel and the second thermal panel.

BRIEF DESCRIPTION OF THE FIGURES

A full and enabling disclosure of this invention, including the best mode shown to one of ordinary skill in the art, is set forth in this specification. The following Figures illustrate the invention.

DETAILED DESCRIPTION OF THE INVENTION

Reference now will be made to the embodiments of the invention, one or more examples of which are set forth below. Each example is provided by way of explanation of the invention, not as a limitation of the invention. In fact, it will be apparent to those skilled in the art that various modifications and variations can be made in this invention without departing from the scope or spirit of the invention. For instance, features illustrated or described as part of one embodiment can be used on another embodiment to yield a still further embodiment. Thus, it is intended that the present invention cover such modifications and variations as come within the scope of the appended claims and their equivalents. Other objects, features and aspects of the present invention are disclosed in or are obvious from the following detailed description. It is to be understood by one of ordinary skill in the art that the present discussion is a description of exemplary embodiments only, and is not intended as limiting the broader aspects of the present invention, which broader aspects are embodied in the exemplary constructions In the application of the invention, it is possible to provide a chamber having a panel on both its upper and lower surfaces that act as infrared heat sinks due to temperature differences in excess of 20° C. across a shallow enclosure. The capability of the present invention to produce infrared head sink and Bernard convection effects represents a change from conventional plant growth chamber water jackets, where vertical wall temperatures have only been used to deliver average room temperatures to chamber perimeters. Cold walls in a conventional water jacket growth chamber would create undesirable humidity and temperature gradients near the chamber edges with little effect on heat accumulation in the center of an enclosure. Greenhouse fluid roofs are usually too large and too exposed to reach temperatures needed for thermal radiation heat-sink effects. Contemporary liquid filters for high intensity growth chamber lighting limit the spectrum of energy transmitted through an open water bath, but they lack any type of closed counter-current configuration to produce uniformly cold surface temperatures inside the growth chamber for convection cooling or radiation heat sinks. An upper surface heat sink alone can supply over 130 W m$^{-2}$ of cooling. Addition of a lower heat sink surface, with air between plants and the chilled panel surface can remove an additional 70 W m$^{-2}$ through radiant heat transfer. Total radiation heat-sink capacity can exceed 200 W m$^{-2}$ of cooling or more than about 60% of the required cooling capacity of a chamber exposed to direct sunlight for most North American climates. This 60% was determined from air temperature, sun angle, solar flux, and atmospheric conditions in Clemson University during June through August 1996. Higher cooling capacity or additional shade options or cooling strategies might be required in warmer states such as Arizona, or South Florida, although 900 W m$^{-2}$ is a commonly accepted solar load design standard for horizontal surfaces. An air-conditioning design maximum solar heat gain of 965 W m$^{-2}$ (306 Btu h$^{-1}$ fte$^{-2}$) is listed on page 25.12 of the ASHRAE 1977 Fundamentals Handbook, in the Air-Conditioning Load section.

The general equation for thermal radiation is given in Equation 1.

$$q_r = f \epsilon \sigma (T_{abs_c 4} - T_{abs}^4) \quad [1]$$

The radiation view factor for chambers with low sidewalls approaches unity, $f \geq 0.9$. Emissivity of $\epsilon \approx 0.95$ holds true for most leaves and acrylic surfaces at infra-red wavelengths. The "black body" concept in thermal radiation is used to distinguish "real" from "ideal" surface heat transfer efficiency. The emissivity of real materials, $\epsilon$, represents the extent to which the surface of a real object approaches the theoretical radiation potential of a perfect "black body" emitter of electromagnetic radiation at the same temperature. The Stefan-Boltzmann constant, $\sigma = 5.67 \times 10^{-8}$, describes the energy radiated by and ideal surface per unit time per unit area per degree surface temperature of an object, in absolute temperature raised to the fourth power. Thermal radiation is defined as radiation detected as heat or light, ($\lambda$0.2 to 1000 $\mu$m), and infrared radiation indicates electromagnetic radiation in the wavelength region, $\lambda$0.7 to 1000 $\mu$m.

Similarly, the induction of Bérnard convection between horizontal parallel surfaces heated from below, is a function of thermal inversion inside the chamber enclosure. Convection compensates for variation in the distance from thermal panels to leaf, and supplies up to about 70 W m$^{-2}$ or about 20% of the cooling requirement.

Air above solar heated leaf surfaces under the cooled transparent panel constitutes an enclosed horizontal fluid layer heated from below, or a thermal inversion. This inversion provides the driving force for natural convection. Given adequate depth, warm air will rise as cooled air falls in parallel convection plumes. This leads to geometric patterns of fluid circulation in the form of paired rotating cylinders, referred to as Bénard cells. Bénard convective fluid motion is driven by buoyancy gradients, where temperature differences cause variation in fluid density, leading to unbalanced gravitational attraction between adjacent regions within a confined volume of air.

Rising warm expanded low-density air retains a constant high temperature until entering a horizontal path adjacent to the cool enclosure ceiling. Then, air temperature drops as air flows along a horizontal region of heat exchange with the cold ceiling panel boundary layer. Once cooled, air remains at a constant cool temperature through its descent in a falling plume of compact dense air. Finally, circulating air is warmed again through heat exchange in a horizontal path across a boundary layer of air in contact with the heated collector at the bottom of the thermally inverted enclosure section.

In general, infrared heat sink and Bérnard convection effects are not practical to induce using traditional spectral filters, plant growth chamber water jackets, greenhouse fluid roofs, or UV absorbing water-baths for high-intensity lighting. Prior art spectral filters shade plant spaces from sunlight or artificial lights, where color pigments block selected wavelengths of light from being transmitted through solid or liquid filters. In liquid light filters, heat is carried away from the protected environment. However, the presence of pigments also increase the rate of temperature rise in the spectral filter panel. Organic pigments tend to decompose in the presence of sunlight and inorganic pigments crystallized and precipitate at low temperatures. Thus, simple liquid spectral filters cannot achieve the substantial degree of cooling afforded using the system of this invention.

Advantages of infra-red and Bernard convection cooling mechanisms over conventional air conditioning methods used for controlling temperatures in plant growth chambers include (1) improved cooling, (2) the use of water instead of air as a heat transfer carrier fluid, (3) decoupling air circulation flow rates from heat transfer requirements, (4) avoidance of inefficiencies in conventional systems such as condensation in air conditioning heat exchangers, and (5) the sanitation advantages of indirect cooling.

Counter-flow panel design and the addition of an insulating air space (i.e.: a "dead space") above the thermal panel can also greatly enhance the efficiency and temperature uniformity of the thermal panels, enabling functional infrared heat sinks and Bérnard convection induction.

Figure 1:
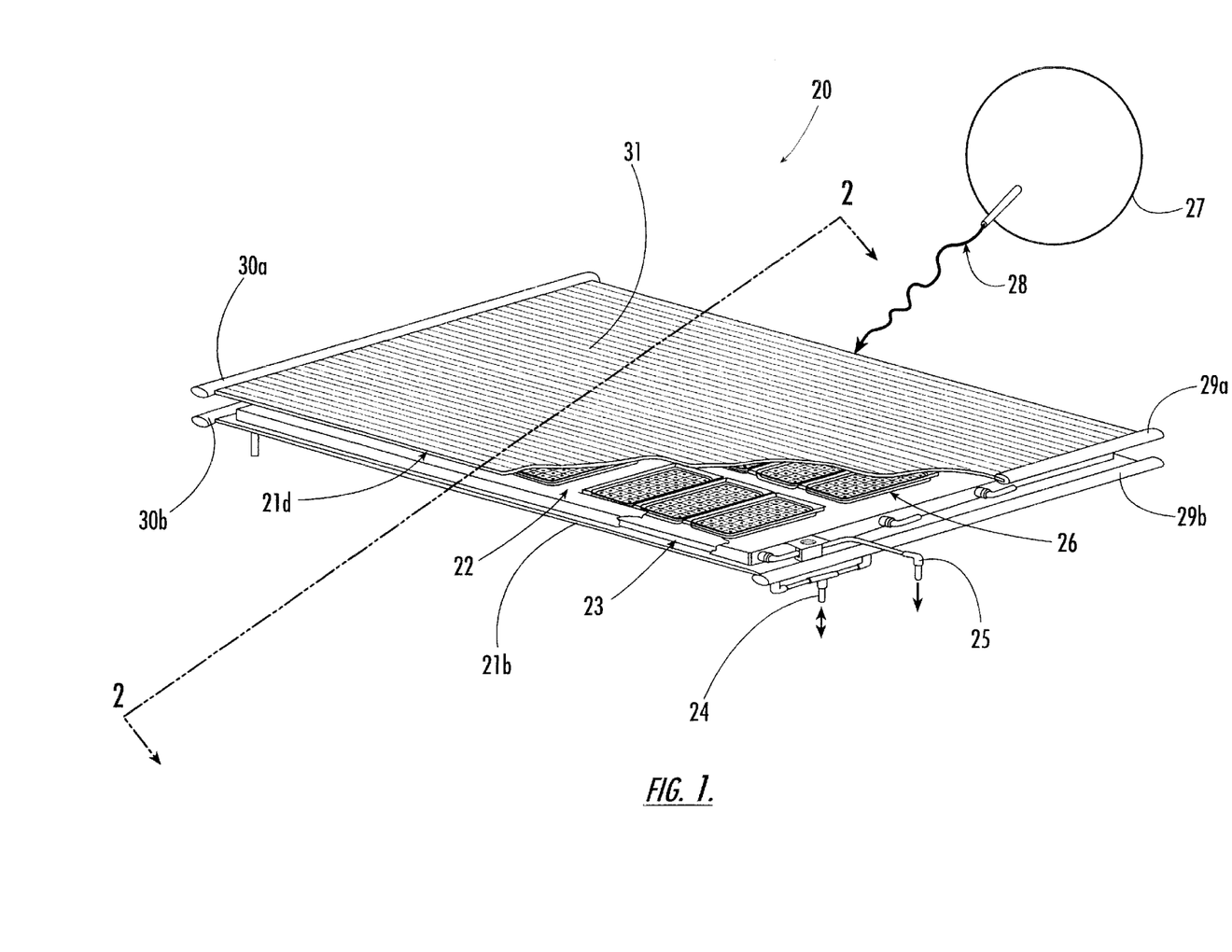
FIG. 1 is a perspective view of the apparatus of the invention.

Turning to FIG. 1, the upper portion of a chamber 20 is shown. A thermal panel 21$a$ is seen on the upper portion of the chamber 20, and a thermal panel 21$b$ is in the lower portion of the chamber 20. In between, a liquid media bath 23 provides nutrient solution for plants that are located on flats 26. The plants grow within the chamber 20, on flats that usually hold the plant roots in a matrix or media. Line 24 is connected to media and reservoirs on the inside of the table (which are not shown). In the operation of the chamber 20, a light source 27 provides light 28 that impinges upon the plurality of channels 31 along the thermal panel 21$a$. Along the right margin and left margin of the panels 21$a$ and 21$b$ are bounded on their edge or margin by headers 30$a$ and 30$b$, respectively. On the right margin as shown in FIG. 1, headers 29$a$ and 29$b$ are shown. The header 29$a$ is connected to the upper thermal panel 21$a$, and the header 29$b$ is connected to the lower thermal panel 21$b$. An overflow line 25 is shown as well.

Figure 2:
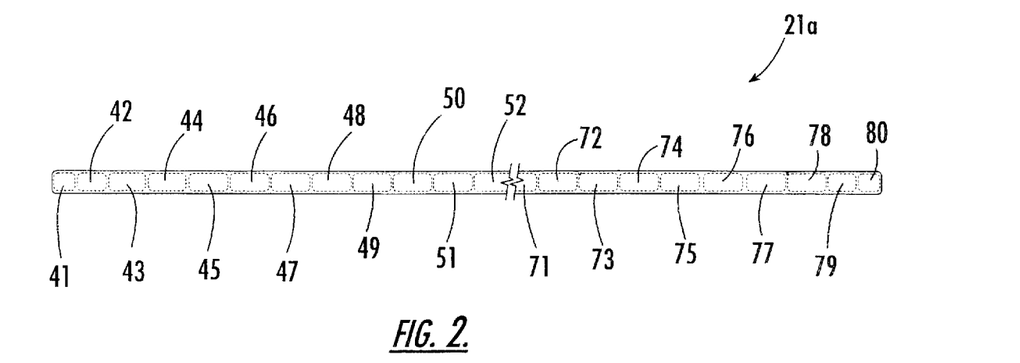
FIG. 2 shows the first thermal panel in cross section.

In FIG. 2, a cross-section of the thermal panel 21$a$ is provided as taken along lines 2—2 of FIG. 1. The plurality of channels 31 are shown, and channels 42, 44, 46, 48, 50, 52, 72, 74, 76, 78, and 80 contain a cooling fluid that flows in a first direction. Furthermore, channels 41, 43, 45, 47, 49, 51, 71, 73, 75, 77, and 79 contain a cooling fluid that flows in a second direction. The first direction and the second direction are substantially opposite each other, approximately 180° apart, in this particular embodiment. However, other embodiments are possible in which the flow directions are tangential, or perhaps at a right angle to each other. That is, the cooling fluid flows in alternating a sequence to achieve the advantages of the invention for adequate cooling and to cause the thermal panel 21$a$ to serve as an efficient heat sink.

Figure 3:
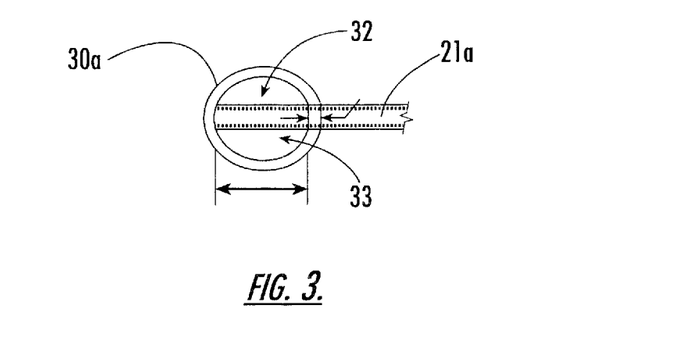
FIG. 3 depicts an end view of a header with a side view of an inserted panel.

In FIG. 3, an end view of the header 30$a$ of the invention may be seen with reference to arrow 3 in FIG. 1. In this particular embodiment, a header 30$a$ and an outlet conduit 32 is shown in the upper portion of the header 30$a$, and an inlet conduit 33 is shown in the lower portion of the header 30$a$. That is, water or other cooling fluid is allowed to proceed into the header 30$a$ along the inlet conduit 33, where it is distributed to the channels of the thermal panel 21$a$. For example, as shown in FIG. 2, an embodiment of the invention having a header 30$a$ that provides a counter-current flow could provide water along inlet conduit 33, across the surface of the thermal panel 21 a within a given channel, and then exit the header on the opposite side of the thermal panel 21$a$ (i.e.: header 29$a$ in FIG. 1) along the outlet conduit within header 29$a$ (not shown). In that way, water is provided in a counter-current flow regime in which water is provided in a counter-flow regime in which water enters both sides of the thermal panel 21$a$, and proceeds along alternating channels in opposite directions. Water then exits the upper portion of the header on the opposite side of the panel 21$a$.

Figure 3A:
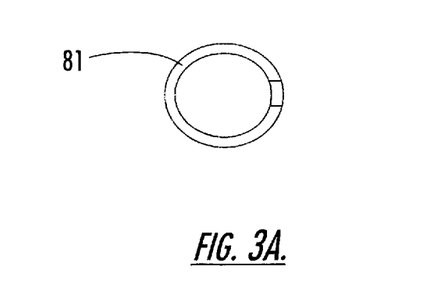
FIG. 3A is an end view of a header.

In other embodiments of the invention, a header with only one reservoir or space for cooling fluid would be used. For example, FIG. 3A shows a header 81 having only one reservoir or conduit flow path. Thus, the invention could employed having a header with a single flow path, a header with a dual flow path, or a header with more than two flow paths within its circumference. In any event, and in any of the embodiments discussed herein, the counter-current flow path still is achieved to provide advantageous thermal effects.

Figure 4:
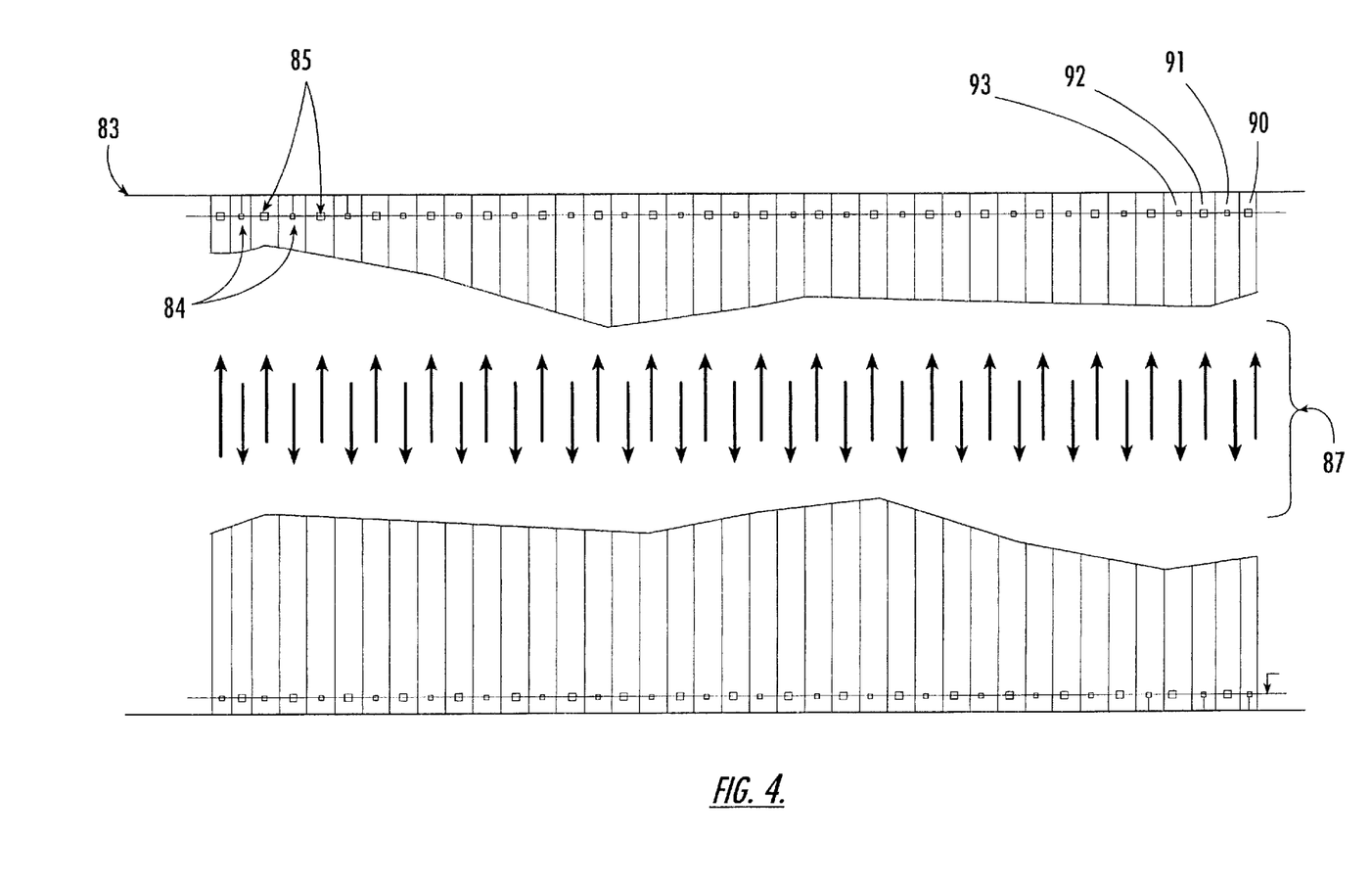
FIG. 4 is a partial top view of the first thermal panel showing one possible arrangement of holes to facilitate a countercurrent flow pattern.

A panel 83 comprises multiple flow channels. Furthermore, holes are provided in the panel on alternating sides of the panel 83 at opposite ends of each channel. For example, a first channel 90, second channel 91, third channel 92, and fourth channel 93 are shown as examples. Obviously, there are more channels upon the panel 83, but these channels are provided to facilitate discussion herein.

A counter-current flow pattern with a cooling fluid flow direction along the arrows in the middle of the FIG. 4 is seen at counter-current flow pattern 87. It can be seen that the flow direction in first channel 90, for example, is opposite the flow direction shown in second channel 91, which is adjacent to first channel 90. Likewise, the third channel 92, which is adjacent to second channel 91, provides an opposite flow direction as well. Thus, the flow directions along each channel alternate as shown along counter-current flow pattern 87 in FIG. 4. Essentially any input or output could be provided to the channels, but in one embodiment manifold headers at the ends of the panel 83 could be divided into upper and lower flow conduits as shown in previous FIG. 3. If that particular embodiment was used, then the water could simultaneously enter the bottom conduit at both ends of the panel. Then, both manifolds could be supplied water to alternating channels through the holes (see holes 84 and holes 85 shown in FIG. 4) along the bottom of the panel and release water or cooling fluid to the upper conduit in the manifold on the opposite side of the panel through a similar array of alternating holes. At each end of the panel, each channel has a hole in either the top or the bottom of the panel, and therefore the arrays of holes at the opposite end to the panel may be arranged in the opposite order. If this particular embodiment is used, one end of the panel would have inlet holes in even numbered channels and outlet holes in odd numbered channels, where the opposite hole pattern would be true at the other end of the panel. Although this alternating hole pattern design is not required in the practice of the invention, it has been shown to be a useful embodiment.

Figure 5:
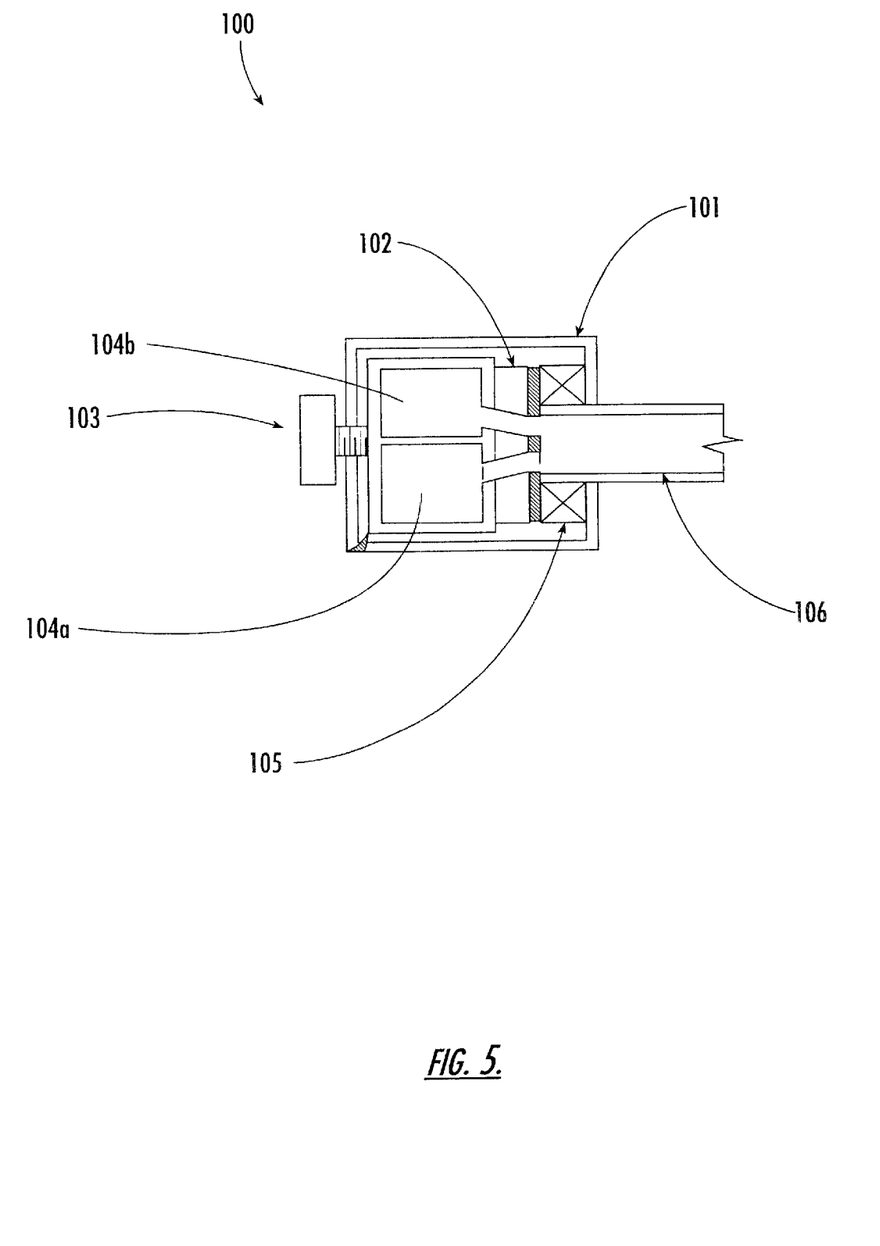
FIG. 5 shows a fiberglass channel enclosure for the header.

Turning to FIG. 5, a channel enclosure or header 100 is shown having an outer surface 101. A diverter plate 102 is provided, with a flow channel 104a and a flow channel 104b shown. A panel end frame 105 also can be seen, and a thumb screw 103, when turned, tightens the header 100 against the thermal panel 106 to provide a snug and tight fitting fluid communication between the two. Furthermore, this type of channel enclosure or header 101 may be removed for cleaning when algae production in the unit becomes excessively high. In this particular application, the thermal panel 106 comprises a Cryo $^{16}/_{32}$ Exolite™ double skinned acrylic sheet. Other types of polycarbonate, or plastic materials, could be used for the thermal panels of the invention, but the above described Exolite™ sheet has been found to work particularly well ("Exolite" is a trademark of Cryo Industries, Inc. of Mississauga, Ontario, Canada). Counter-current flow panel design greatly increases (i.e.: sometimes doubles) the coolant flow rate over the capacity of one-directional flow pattern panels. In addition, counter-flow reduced by one-half the number of channels supplied by each inlet manifold. Counter-current flow also served to average temperatures between adjacent channels opposite flow directions.

Addition of a dead-air space above the top panel greatly reduces heat exchange with the surrounding atmosphere, eliminates condensation on the top surface of the panel and insulated the panel and chamber from ambient heat loads. However, a dead air space is not required in the practice of the invention.

Sidewalls also may be employed. This provides for the advantages of carbon dioxide enrichment and environmental cleanliness. Indirect cooling allows for sealed sidewalls.

Carbon dioxide injection also can be used, and provides gas for plant growth. Panel installation facilities are typically housed in unheated greenhouses. Carbon dioxide (i.e. $CO_2$) delivery and control in an unheated greenhouse environment requires several special adaptations to protect gas analysis instrumentation from condensation in sample tubing, minimize system and instrument maintenance and calibration requirements, and at the same time safeguard closed chambers from either $CO_2$ overexposure or deprivation.

System elements may include a gas mixing center, which receives pure (ethylene-free) $CO_2$ and delivers a 10,000 ppm air mixture to as many as 24 chambers. One design requires two infra-red gas analysis instruments, one to control the mixing unit and another to monitor chamber concentrations in the field. All carbon dioxide (i.e. $CO_2$) mixing equipment is housed inside an air-conditioned enclosure, and all gas analysis instruments are equipped with miniature condenser, dryer and filter units.

The chamber may be equipped with a durable air circulating system, designed to distribute $CO_2$ evenly throughout the enclosure. Chamber adaptations provide the ability to draw samples from inside at random locations within the plant canopy in selected chambers. Controls for the include a proprietary level conductivity sensor, where the signal conditioning electronic components are built into a unique single-board computer controller. Controllers can be accessed in the field through key-pad and display screens or through RS-232 type lap-top connections, and they can be linked via RS-232 or RS485 serial connections to a dedicated desktop operator interface. (RS-232 and RS485 components are available from Newark Electronics, Inc. of Chicago, Ill. U.S.A. Other such lap-top connections could also be used, which would have a similar functionality. The desktop operator console is also capable of serving as a secure web server, from which history files made available for graphic or tabular web page displays of system performance, and a person of skill in the art could prepare software programming to perform these functions.

It also would be possible to deploy the invention as a chilled transparent light filter. In this way, the invention could be deployed to enhance a human habitation or a commercial space. In one embodiment, the invention could be used to add "heat mirror" films or tempered glass cover plates to cool stage lighting or to greatly improve the working condition of actors and television personnel on a television set which requires high intensity lighting. In another application of the invention, it would be possible to enhance the comfort of burn patients by filtering infrared radiation that would otherwise be transmitted through sun-lit sun porches or solariums.

It is understood by one of ordinary skill in the art that the present discussion is a description of exemplary embodiments only, and is not intended as limiting the broader aspects of the present invention, which broader aspects are embodied in the exemplary constructions. The invention is shown by example in the appended claims.

What is claimed is:

1. A system for propagating plants, comprising:
   (a) a first thermal panel having an interior space, the thermal panel being located between a growing space and a light source, the growing space being adapted for propagating plants;
   (b) a cooling fluid, wherein the first thermal panel is adapted for circulating the cooling fluid along its interior space to reduce the temperature of the growing space; and
   (c) wherein the first thermal panel is adapted for circulating the cooling fluid in at least two different directions to achieve a countercurrent flow pattern.

2. The system of claim 1 in which the first thermal panel is subdivided into a plurality of channels.

3. The system of claim 2 in which at least a first channel and a second channel are provided substantially parallel to each other.

4. The system of claim 3 in which cooling fluid flows in a first direction in the first channel, and in a second direction in the second channel, wherein the first direction and second direction are essentially opposed to each other.

5. The system of claim 4 in which a third channel and a fourth channel are provided, the third channel lying adjacent the second channel and the fourth channel lying adjacent the third channel, such that the first, second, third, and fourth channels are aligned substantially parallel to each other.

6. The system of claim 5 in which the flow direction along the third channel is in the first direction, and the flow direction along the fourth channel is in the second direction, such that the flow direction in respective channels alternates from the first direction to the second direction in successive channels.

7. The system of claim 1 in which the first thermal panel provides a heat sink such that a significant portion of the heat that is generated from radiation transmitted into the first thermal panel is absorbed by the cooling fluid.

8. The system of claim 1 in which the cooling fluid consists essentially of water.

9. The system of claim 1 in which the cooling fluid comprises a mixture of water and ethylene glycol.

10. The system of claim 1 in which the plants further include photoreceptor sites upon their leaves, further wherein the first thermal panel includes a lower surface and an upper surface, such that the average temperature difference between the photoreceptor sites and the lower surface of the first thermal panel is at least 20 degrees C.

11. The system of claim 1 in which a second thermal panel is provided, such that the plants are located between the first thermal panel and the second thermal panel.

12. The system of claim 1 in which the second thermal panel is adapted for circulating cooling fluid.

13. The system of claim 12 in which in at least two different directions to achieve a countercurrent flow pattern.

14. The system of claim 2 in which the first thermal panel comprises a first margin and a second margin, the first thermal panel comprising a first header along the length of the first margin, thereby providing fluid conductivity between the first header and the channels.

15. The system of claim 14 in which the first thermal panel comprises a second header along the length of the second margin, the second header providing fluid conductivity between the second header and the channels.

16. The system of claim 14 in which the first header is subdivided into at least two conduits, each of the conduits being capable of providing independent flow of cooling fluid to the first thermal panel.

17. The system of claim 15 in which the first and second headers are subdivided into at least two conduits, each of the conduits being capable of providing independent flow of cooling fluid to the first thermal panel.

18. The system of claim 1 in the first thermal panel is provided with an upper surface and a lower surface, further wherein a dead air space is provided along the upper surface of the first thermal panel.

19. The system of claim 1 in which the growing space is provided with a liquid media for uptake by the plants.

20. An apparatus for propagating plants, comprising:
 (a) a first thermal panel having an upper surface and a lower surface;
 (b) a second panel located below the first thermal panel;
 (c) a growing space between the first thermal panel and the second panel, the growing space being adapted for propagating plants;
 (d) a plurality of channels within the first thermal panel, the channels being adapted for circulating a cooling fluid to reduce the temperature within the growing space; and
 (e) at least one side wall capable of isolating air space between thermal panels;
 (f) wherein the first thermal panel is adapted for circulating the cooling fluid within said channels in at least two different directions to achieve a countercurrent flow pattern.

21. The apparatus of claim 20 in which the first thermal panel is configured with first and second headers, the first and second headers being adapted to carry fluid to and from the channels.

22. The apparatus of claim 21 in which the first header is subdivided into at least two conduits, each of the conduits being capable of providing independent flow of cooling fluid to the first thermal panel.

23. The system of claim 21 in which the first and second headers are subdivided into at least two conduits, each of the conduits being capable of providing independent flow of cooling fluid to the first thermal panel.

24. The system of claim 20 in the first thermal panel is provided with an upper surface and a lower surface, further wherein a dead air space is provided along the upper surface of the first thermal panel.

25. The system of claim 20 in which the growing space is provided with a liquid media for uptake by the plants.

* * * * *

UNITED STATES PATENT AND TRADEMARK OFFICE
CERTIFICATE OF CORRECTION

PATENT NO. : 6,399,367 B1
DATED : June 4, 2002
INVENTOR(S) : Robert Pollock, Jeffrey W. Adelberg, Charles Fox and Gianpaolo Bonaca It is certified that error appears in the above-identified patent and that said Letters Patent is hereby corrected as shown below:

Column 4,
Line 54, please delete $q_r{}' = f \varepsilon \sigma (T^4_{abs\,c} - T^4_{abs\,t})$ and insert -- $q_r = f \varepsilon \sigma (T^4_{C_{abs}} - T^4_{T_{abs}})$ --.

Signed and Sealed this

Twenty-eighth Day of January, 2003

JAMES E. ROGAN
*Director of the United States Patent and Trademark Office*